US012316065B1

United States Patent
Huang et al.

(10) Patent No.: US 12,316,065 B1
(45) Date of Patent: May 27, 2025

(54) SELF-SEEDING A BIDIRECTIONAL MODE-LOCKED LASER

(71) Applicant: THE REGENTS OF THE UNIVERSITY OF COLORADO, A BODY CORPORATE, Denver, CO (US)

(72) Inventors: Shu-Wei Huang, Broomfield, CO (US); Bowen Li, Boulder, CO (US)

(73) Assignee: THE REGENTS OF THE UNIVERSITY OF COLORADO, A BODY CORPORATE

( * ) Notice: Subject to any disclaimer, the term of this patent is extended or adjusted under 35 U.S.C. 154(b) by 0 days.

(21) Appl. No.: 18/866,832

(22) PCT Filed: May 18, 2023

(86) PCT No.: PCT/US2023/022747
§ 371 (c)(1),
(2) Date: Nov. 18, 2024

(87) PCT Pub. No.: WO2023/225205
PCT Pub. Date: Nov. 23, 2023

Related U.S. Application Data

(60) Provisional application No. 63/364,908, filed on May 18, 2022.

(51) Int. Cl.
*H01S 3/1112* (2023.01)
*H01S 3/067* (2006.01)
(Continued)

(52) U.S. Cl.
CPC ........ *H01S 3/1112* (2013.01); *H01S 3/06712* (2013.01); *H01S 3/06791* (2013.01);
(Continued)

(58) Field of Classification Search
CPC .... H01S 3/06791; H01S 3/105; H01S 3/1109; H01S 3/1112; G02F 2203/56
See application file for complete search history.

(56) References Cited

U.S. PATENT DOCUMENTS

| 4,846,574 A | 7/1989 | Upton, Jr. |
| 5,289,493 A | 2/1994 | Fink |

(Continued)

FOREIGN PATENT DOCUMENTS

WO  WO-2021155273 A1 * 8/2021 ......... H01S 3/06712

OTHER PUBLICATIONS

International Patent Application No. PCT/US2023/022747 International Search Report and Written Opinion dated Aug. 14, 2023, 16 pages.

(Continued)

*Primary Examiner* — Michael Carter
(74) *Attorney, Agent, or Firm* — Cozen O'Connor

(57) ABSTRACT

A system for self-seeding a bidirectional mode-locked laser includes a variable retroreflector optically coupled to an output port of the laser. In a first operating state, the variable retroreflector retroreflects output light from the output port back into the output port. In a second operating state, the variable retroreflector does not retroreflect the output light. To use the system, the laser is unidirectionally mode-locked to generate a first pulse train that exits the laser via a first output port. The variable retroreflector, in the first operating (Continued)

state, retroreflects output light from a second output port of the laser back into the laser to initiate bidirectional mode-locking. When the laser transitions to bidirectional mode-locking, this output light becomes a second pulse train. The variable retroreflector is then transitioned to the second operating state such that the second pulse train can be used for the application at hand.

20 Claims, 10 Drawing Sheets

(51) Int. Cl.
    *H01S 3/094*     (2006.01)
    *H01S 3/10*     (2006.01)
    *H01S 3/102*     (2006.01)
    *H01S 3/105*     (2006.01)
    *H01S 3/16*     (2006.01)

(52) U.S. Cl.
    CPC .... *H01S 3/094069* (2013.01); *H01S 3/10092* (2013.01); *H01S 3/1022* (2013.01); *H01S 3/105* (2013.01); *H01S 3/1618* (2013.01); *H01S 3/06745* (2013.01)

(56) References Cited

U.S. PATENT DOCUMENTS

| | | | | |
|---|---|---|---|---|
| 5,383,198 A * | 1/1995 | Pelouch | ............... | H01S 3/1112 372/18 |
| 2005/0036150 A1 | 2/2005 | Izatt et al. | | |
| 2007/0110375 A1 | 5/2007 | Harvey | | |
| 2007/0297042 A1 * | 12/2007 | Bifano | ............... | G02B 26/02 359/318 |

OTHER PUBLICATIONS

Li et al., "Unidirectional dissipative soliton operation in an all-normal-dispersion bidirectional Yb-doped fiber laser without an isolator", arXiv:1510.01020v1 [physics.optics], Oct. 2015, 6 pages.

Yang et al., "Counter-propagating solitons in microresonators", arXiv:1704.08409v2 [physics.optics], May 2017, 7 pages.

Kieu et al., "All-fiber bidirectional passively mode-locked ring laser", Optics Letters, vol. 33, No. 1, Jan. 1, 2008, pp. 64-66.

International Patent Application No. PCT/US2023/022747 International Preliminary Report on Patentability dated Apr. 24, 2024, 4 pages.

Zeng et al., "Bidirectional fiber soliton laser mode-locked by single-wall carbon nanotubes", Optics Express, vol. 21, No. 16, Aug. 2013, 6 pages.

Chernysheva et al., "Isolator-free switchable uni-and bidirectional hybrid mode-locked erbium-doped fiber laser", Optics Express, vol. 24, No. 14, Jul. 11, 2016, p. 15721-15729.

Ideguchi et al., "Kerr-lens mode-locked bidirectional dual-comb ring laser for broadband dual-comb spectroscopy", Optica, vol. 3, No. 7, Jul. 2016, pp. 748-753.

Li et al., "Bidirectional mode-locked all-normal dispersion fiber laser", Optica, vol. 7, No. 8, Aug. 2020, pp. 961-964.

Zhao et al., "Self-started unidirectional operation of a fibre ring soliton laser without an isolator", Journal of Optics A: Pure And Applied Optics, vol. 9, Apr. 2007, pp. 477-479.

* cited by examiner

FIG. 8C  FIG. 8D

SELF-SEEDING A BIDIRECTIONAL MODE-LOCKED LASER

RELATED APPLICATIONS

This application claims priority to U.S. Provisional Patent Application No. 63/364,908, filed on May 18, 2022, the entirety of which is incorporated herein by reference.

BACKGROUND

A dual-comb system is a laser system that generates two frequency combs.

SUMMARY

Bidirectional mode-locking is a technique for generating two optical frequency combs from a single ring cavity or resonator. In bidirectional mode-locking, the two optical frequency combs are generated from two pulse trains that propagate around the ring cavity in two opposite directions, namely the clockwise and counter-clockwise directions. When the round-trip propagation times of the clockwise and counter-clockwise pulse trains are different, the two optical frequency combs will have different comb spacings, or repetition rates. A ring cavity having these different round-trip propagation times is referred to as "asymmetric."

Bidirectional mode-locking has been demonstrated with fiber lasers [1-6], solid-state lasers [7], and microresonators [8]. The single ring cavity may be a laser cavity (i.e., with gain) or a passive cavity (i.e., without gain). Since bidirectional mode-locking uses only one ring cavity to generate two frequency combs, dual-comb systems based on bidirectional mode-locking exhibit excellent common-mode rejection, high mutual coherence between the two frequency combs, and low cross talk between the two frequency combs, even when free running (i.e., without active stabilization). Due to these advantages, dual-comb systems based on bidirectional mode-locking are compact and robust, making them useful for applications such as gas sensing [9, 10], biological imaging [11-13] and ranging [14, 15].

The present embodiments include systems and methods for self-seeding a bidirectional mode-locked laser. Here, the term "self-seeding" means that output light from the laser is injected back into the laser cavity to transition it into a bidirectional mode-locked state (e.g., from a unidirectional mode-locked state). The present embodiments may be used with various kinds of mode-locked lasers, including fiber and solid-state. Advantageously, the present embodiments simplify operation of dual-comb systems based on bidirectional mode-locked lasers by ensuring that the laser quickly and reliably operates in the bidirectional mode-locked state without intervention from a user (e.g., a technician or experimenter). Accordingly, the present embodiments may be used to make dual-comb systems more "turn-key" by automating their power-on sequence and initiation. The present embodiments may also be used to quickly and automatically restore bidirectional mode-locking when the mode-locked laser inadvertently transitions to unidirectional mode-locking or continuous-wave operation.

BRIEF DESCRIPTION OF THE FIGURES

FIGS. 8C and 8D show the pulse energies of the first and second outputs, respectively, of the CANDi fiber laser of FIG. 5 as a function of time.

DETAILED DESCRIPTION

Figure 1:
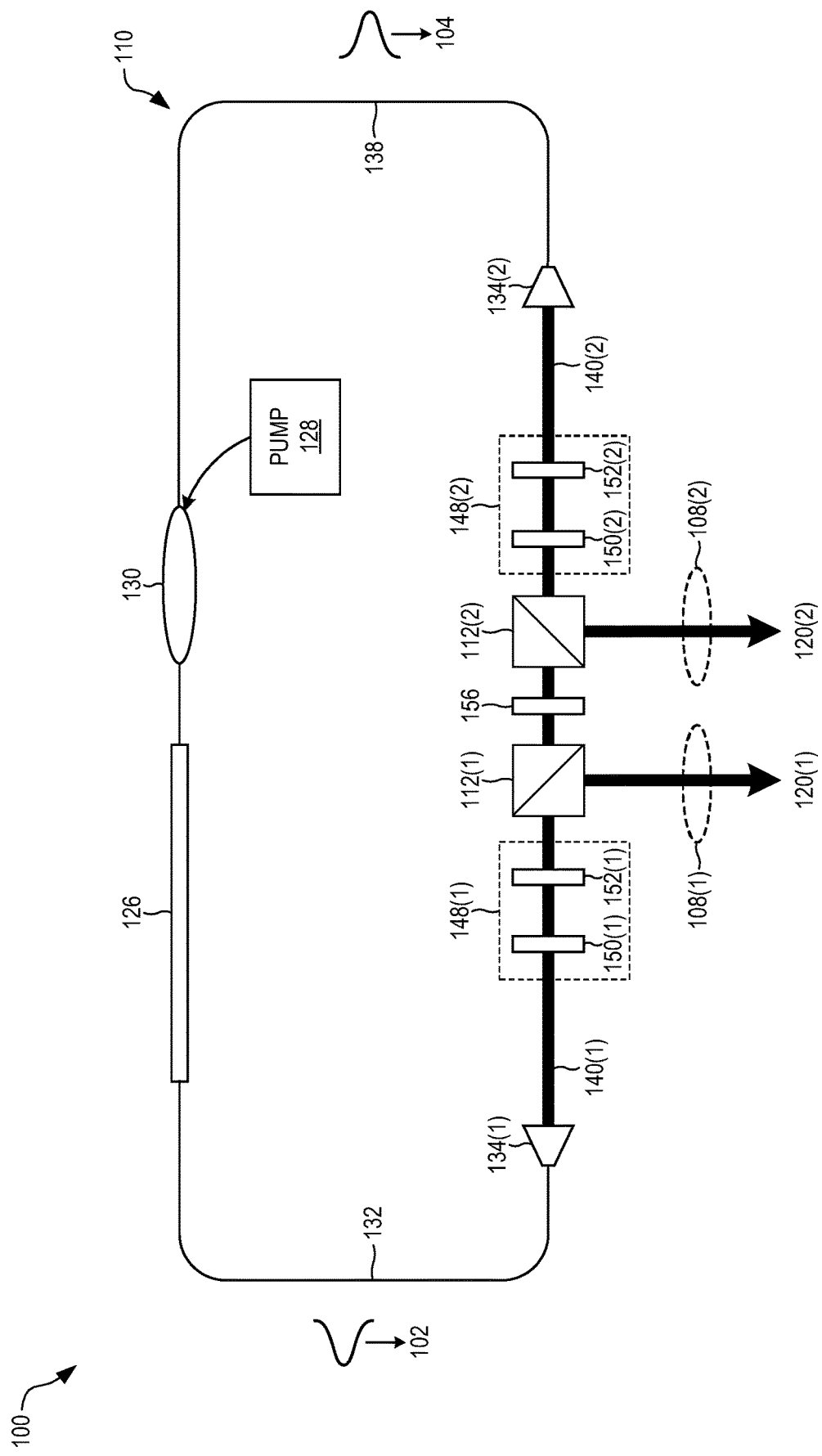
FIG. 1 is a block diagram of a bidirectional mode-locked fiber laser, in embodiments.

FIG. 1 is a block diagram of a bidirectional mode-locked fiber laser 100 that mode-locks in both clockwise (CW) and counter-clockwise (CCW) directions simultaneously. The fiber laser 100 uses fiber-optic and free-space components arranged in a loop 110 to simultaneously generate a CW pulse train 104 and a CCW pulse train 102 that propagate around the loop 110 in opposite directions. The loop 110 serves as a laser cavity that uses a doped fiber 126 as a gain medium. The doped fiber 126 is pumped by a pump laser 128 whose output (i.e., pump light) is coupled into the loop 110 via a pump combiner 130. The loop 110 also includes a first optical fiber 132 that couples one end of the doped fiber 126 to a first collimator 134(1), which in turn outputs the CCW pulse train 102 as a first free-space beam 140(1). The loop 110 also includes a second optical fiber 138 that couples the pump combiner 130 to a second collimator 134(2), which in turn outputs the CW pulse train 104 as a second free-space beam 140(2). The optical fibers 132 and 138 are also referred to herein as "passive" fibers to differentiate them from the active gain of the doped fiber 126.

To achieve nonlinear polarization rotation, the bidirectional mode-locked fiber laser 100 includes a first polarization controller 148(1) and a second polarization controller 148(2). Due to nonlinear phase shifts imparted onto the pulse trains 102 and 104 by the optical fibers 132 and 138, the first free-space beam 140(1) is elliptically polarized. The first polarization controller 148(1) includes a first quarter-waveplate 152(1) that can be adjusted to convert this elliptical polarization into linear polarization. The first polarization controller 148(1) also includes a first half-waveplate 150(1) that can be adjusted to rotate the linear polarization, thereby controlling the fraction of the first free-space beam 140(1) that is reflected by a first polarized beamsplitter (PBS) 112(1) to form a first output beam 120(1). Similarly, the second polarization controller 148(2) includes a second quarter-waveplate 152(2) that can be adjusted to convert the elliptical polarization of the second free-space beam 140(2) into linear polarization and a second half-waveplate 150(2) that can be adjusted to rotate this linear polarization, thereby controlling the fraction of the second free-space beam 140(2) that is reflected by a second PBS 112(2) to form a second output beam 120(2). The first output beam 120(1) exits the mode-locked laser 100 via a first output port 108(1). Similarly, the second output beam 120(2) exits the mode-locked laser 100 via a second output port 108(2).

While FIG. 1 shows each of the polarization controllers 148(1) and 148(2) as a combination of a half-waveplate and quarter-waveplate, each of the polarization controllers 148(1) and 148(2) may be formed from one or more other components that control polarization (e.g., an electro-optic phase shifter, a liquid-crystal phase shifter, a Babinet-Soleil compensator, etc.). Alternatively, the first polarization controller 148(1) can be implemented with one or more fiber squeezers that compress the first optical fiber 132 to change its birefringence. The second polarization controller 148(2) may be similarly implemented with one or more fiber squeezers that compress the second optical fiber 138 to change its birefringence.

To support simultaneous bidirectional mode-locking with different repetition rates, the bidirectional mode-locked fiber laser 100 is designed with asymmetric nonlinear phase shifts. Specifically, the doped fiber 126 imparts a nonlinear phase shift $\phi_1 = \gamma_{DF}^{(CCW)} P_{CCW} L_{DF}$ onto the CCW pulse train 102, where $\gamma_{DF}^{(CCW)}$ is the effective nonlinear coefficient of the doped fiber 126 in the CCW direction, $P_{CCW}$ is the power of the CCW pulse train 102, and $L_{DF}$ is the length of the doped fiber 126. Similarly, the first optical fiber 132 imparts a nonlinear phase shift $\phi_2 = k_1 \gamma_1 P_{CCW} L_1$ onto the CCW pulse train 102, where $k_1$ is the fraction of the power of the CCW pulse train 102 that is coupled from the doped fiber 126 into the first optical fiber 132, $\gamma_1$ is the nonlinear coefficient of the first optical fiber 132, and $L_1$ is the length of the first optical fiber 132. After a portion of the CCW pulse train 102 is coupled out of the loop 110 via the first PBS 112(1), the remaining portion of the CCW pulse train 102 propagates through the second optical fiber 138 to return to the doped fiber 126. Due to the reduced power in the second optical fiber 138, the nonlinear phase shift imparted onto the CCW pulse train 102 by the second optical fiber 138 is small enough that it can be ignored. Free-space components between, and including, the collimators 134(1) and 134(2) are linear and therefore do not impart any nonlinear phase shift onto the pulse trains 102 and 104. Therefore, the total nonlinear phase shift in the CCW direction is $$\varphi_{CCW} \approx \phi_1 + \phi_2 = \gamma_{DF}^{(CCW)} P_{CCW} L_{DF} + k_1 \gamma_1 P_{CCW} L_1 \qquad (1)$$

A similar argument in the CW direction gives $$\varphi_{CW} \approx \phi_3 + \phi_4 = \gamma_{DF}^{(CW)} P_{CW} L_{DF} + k_2 \gamma_2 P_{CW} L_2, \qquad (2)$$

where $\gamma_{DF}^{(CW)}$ is the effective nonlinear coefficient of the doped fiber 126 in the CW direction, $k_2$ is the fraction of the power of the CW pulse train 104 that is coupled from the doped fiber 126 into the second optical fiber 138, $P_{CW}$ is the power of the CW pulse train 104, and $L_2$ is the length of the second optical fiber 138. The phase shifts $\varphi_{CCW}$ and $\varphi_{CW}$ are asymmetric in that $\varphi_{CCW} \neq \varphi_{CW}$.

Each pulse of the CCW pulse train 102 travels once around the loop 110 in a CCW loop time $\Delta t^{(CCW)}$ that depends on $\varphi_{CCW}$, while each pulse of the CW pulse train 104 travels once around the loop 110 in a CW loop time $\Delta t^{(CW)}$ that depends on $\varphi_{CW}$. Accordingly, the CCW pulse train 102 has a CCW repetition rate $f_{rep}^{(CCW)} = 1/\Delta t^{(CCW)}$, and the CW pulse train 104 has a clockwise repetition rate of $f_{rep}^{(CW)} = 1/\Delta t^{(CW)}$. Since $\varphi_{CCW} \neq \varphi_{CW}$, the repetition rates $f_{rep}^{(CCW)}$ and $f_{rep}^{(CW)}$ are not identical, even though the pulse trains 102 and 104 both travel through the loop 110. The difference in repetition rates $\Delta f_{rep} = f_{rep}^{(CCW)} - f_{rep}^{(CW)}$ can be controlled (e.g., from less than 0.1 Hz to more than 150 Hz) by changing the power outputted by the pump laser 128, the first polarization controller 148(1), the second polarization controller 148(2), or a combination thereof. Such small differences in the repetition rates $f_{rep}^{(CCW)}$ and $f_{rep}^{(CW)}$ particularly advantageous for dual-comb spectroscopy (DCS), which relies on two spatially-overlapped pulse trains whose repetition rates differ by approximately this amount.

Asymmetric nonlinear phase shifts can be generated by varying any of the parameters in Eqns. 1 and 2. For example, the lengths of the optical fibers 132 and 138 can be made slightly different (i.e., $L_1 \neq L_2$). Alternatively, the first optical fiber 132 and the second optical fiber 138 can be made with different materials or core sizes (i.e., $\gamma_1 \neq \gamma_2$). In this case, the optical fibers 132 and 138 can have the same length or different lengths. In one embodiment, each of the optical fibers 132 and 138 is a single-mode fiber (e.g., Corning HI1060). In one embodiment, $L_1 = 0.7$ m and $L_1 = 1.2$ m.

Asymmetric nonlinear phase shifts can be generated using optical fibers 132 and 138 that are of the same nominal type and nominal length. When the optical fibers 132 and 138 have the same length, the fiber laser 100 has a physically symmetric cavity. However, a slight difference in the optical-fiber lengths (e.g., 1 mm, or less) may arise due to imperfections in cutting, cleaving, measuring, etc. Similarly, manufacturing variations may cause two pieces of the same type of optical fiber to have slightly different nonlinear coefficients, and therefore asymmetric phase shifts in the CW and CCW directions. These slight variations may introduce enough asymmetry to ensure simultaneous bidirectional mode-locking, even for a physically symmetric cavity.

Another way to generate asymmetric nonlinear phase shifts is to change the direction along which pump light is coupled into the doped fiber 126. For example, FIG. 1 shows the pump combiner 130 coupling pump light into the CCW direction of the loop 110. The pump combiner 130 may be alternatively located on the other end of the doped fiber 126, wherein the pump combiner 130 couples pump light into the CW direction of the loop 110. These examples of unidirectional pumping of the doped fiber 126 cause $\gamma_{DF}^{(CW)}$ and $\gamma_{DF}^{(CCW)}$ to differ. In other embodiments, two pump combiners 130 are used to couple pump light into both ends of the doped fiber 126. In this case, the amount of pump light coupled into each end of the doped fiber 126 can be controlled to adjust how much $\gamma_{DF}^{(CW)}$ and $\gamma_{DF}^{(CCW)}$ differ.

The doped fiber 126 may be doped with ytterbium, erbium, neodymium, holmium, thulium, or another dopant. In one example, the doped fiber 126 is a double-clad ytterbium-doped fiber with a length of two meters. In this case, the pump laser 128 may be a high-power (e.g., two watts or more) multimode laser with an output at 980 nm that is coupled into an inner cladding of the double-clad fiber. However, the doped fiber 126 may have a different length without departing from the scope hereof.

In some embodiments, both the optical fibers 132 and 138 and the doped fiber 126 are large-mode area, few-mode optical fibers with matching core size to reduce fiber nonlinearity, thereby increasing pulse energy. For example, the doped fiber 126 may be a piece of Nufern LMA-YDF-10/125-9 M fiber while each of the optical fibers 132, 138 may be a piece of Nufern LMA-GDF-10/125-M fiber. As another example, the doped fiber 126 may be a piece of Nufern LMA-YDF-20/130-130 M fiber while each of the optical fibers 132, 138 may be a piece of Nufern LMA-GDF-20/130-M fiber. Since multiple spatial modes are supported in few-mode fibers, these embodiments can achieve bidirectional mode-locking on a fundamental spatial mode, a single higher-order spatial mode, or multiple spatial modes (i.e., spatial temporal mode-locking), thereby benefitting different applications.

In another embodiment, the doped fiber 126 is a tapered doped fiber, wherein the fiber nonlinear coefficient γ depends on distance along the length of the tapered fiber. In this case, the nonlinear phase shift imparted by the tapered fiber is $\int \gamma(x) P dx$, where the integral is taken over the length of the tapered fiber. When used with unidirectional pumping, the doped fiber 126 being tapered further causes $\gamma_{DF}^{(CW)}$ and $\gamma_{DF}^{(CCW)}$ to differ.

In some embodiments, the bidirectional mode-locked fiber laser 100 includes a spectral bandpass filter 156 between the first PBS 112(1) and the second PBS 112(2). The bandpass filter 156 stabilizes mode-locked operation of the fiber laser 100 by producing self-amplitude modulation, which allows the nonlinear polarization evolution to be biased to higher pulse energies. The bandpass filter 156 may be an interference filter or birefringent filter (e.g., a Lyot filter) with a full-width at half maximum (FWHM) bandwidth of several nanometers (e.g., 10 nm) centered at a center wavelength of the pulse trains 102 and 104. For example, when the doped fiber 126 is a double-clad ytterbium-doped fiber, the bandpass filter 156 may be selected with a center wavelength of 1070 nm and a FWHM bandwidth of 10 nm.

While FIG. 1 shows the fiber laser 100 as a combination of fiber-optic and free-space components, any one or more of the free-space components may be alternatively implemented as a corresponding fiber-optic component. These free-space components include the polarization controllers 148(1) and 148(2), the PBSs 112(1) and 112(2), and the bandpass filter 156. In some embodiments, all of the components of the fiber laser 100 are fiber-optic, in which case the fiber laser 100 is an all-fiber laser. In this case, the collimators 134(1) and 134(2) are unnecessary, and therefore may be excluded.

As described above, the bidirectional mode-locked fiber laser 100 uses only all-normal dispersion (AND) components. However, the fiber laser 100 may alternatively include components that introduce anomalous dispersion (i.e., negative GVD) into the loop 110. The anomalous dispersion may be introduced, for example, via an optical fiber and/or "bulk" optics (e.g., prisms and/or gratings). An amount of the anomalous dispersion may be chosen to compensate for normal dispersion in the cavity, such that the total dispersion is close to zero. In this case, the fiber laser 100 operates in the dispersion-managed regime. Alternatively, the amount of the anomalous dispersion may be selected to be large relative to any normal dispersion in the cavity, wherein the fiber laser 100 operates in the soliton regime.

Figure 2:
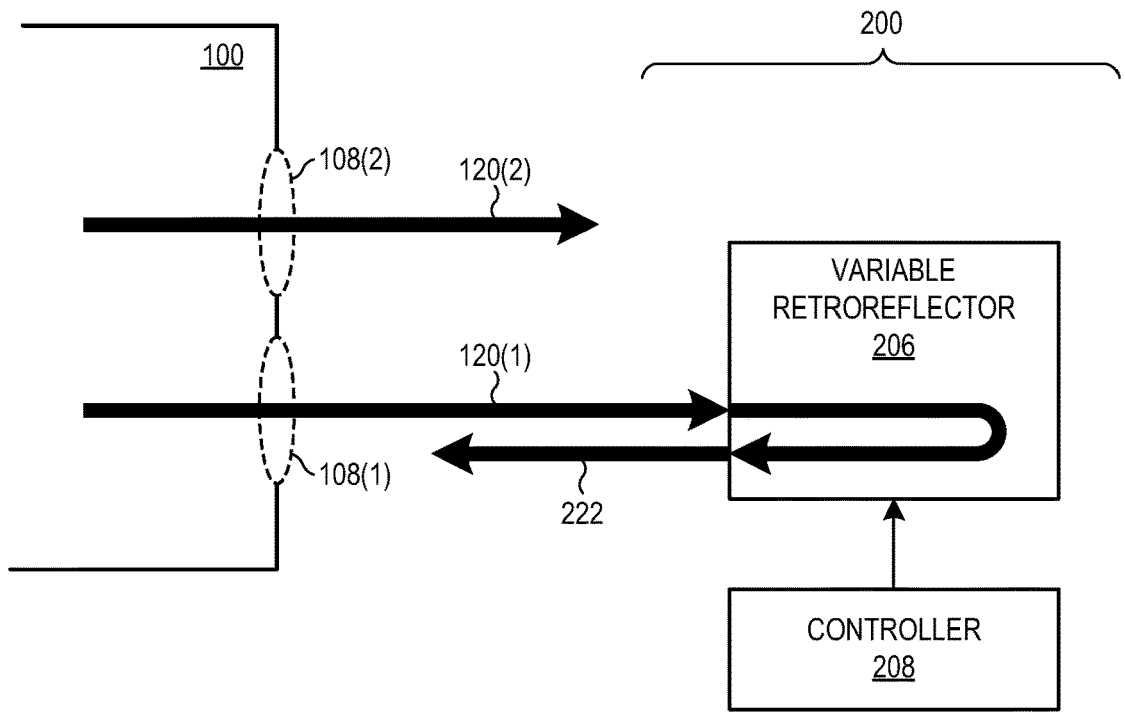
FIG. 2 is a block diagram of a system for self-seeding the bidirectional mode-locked fiber laser of FIG. 1, in embodiments.

FIG. 2 is a block diagram of a system 200 for self-seeding the bidirectional mode-locked fiber laser 100 of FIG. 1. The system 200 includes a variable retroreflector 206 that can be controlled to transition between first and second operational states. FIG. 2 shows the variable retroreflector 206 in the first operational state, where it retroreflects the first output beam 120(1) into a retroreflected beam 222 that is coupled back into the first output port 108(1). After coupling back into the loop 110, the retroreflected beam 222 seeds the mode-locked laser 100. For this reason, the power of the retroreflected beam 222 is also referred to as the seed power. In some embodiments, the system 200 includes a controller 208 that controls the variable retroreflector 206. In other embodiments, the controller 208 is provided by a third party.

Figure 3:
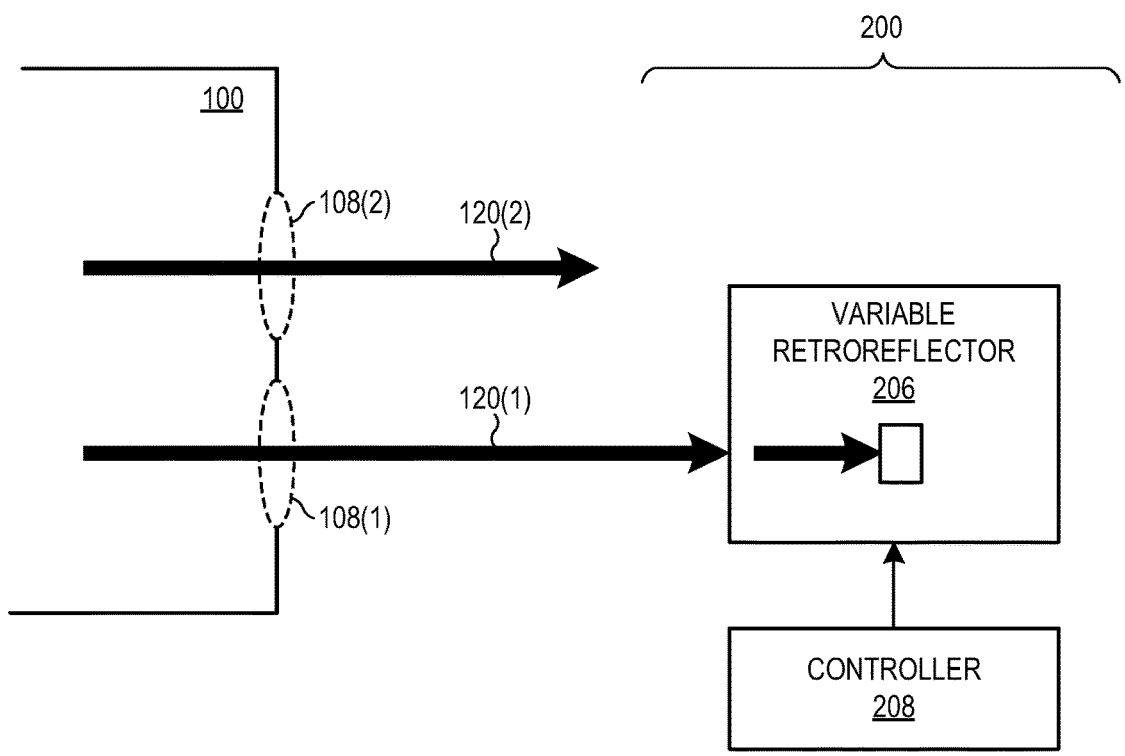
FIG. 3 shows the system of FIG. 2 in a second operational state, in embodiments.

FIG. 3 shows the system 200 in the second operational state. Here, the variable retroreflector 206 does not retroreflect the first output beam 120(1) back into the first output port 108(1). Instead, the variable retroreflector 206 may reflect the first output beam 120(1) away from the first output port 108(1) (e.g., into a beam dump or photodetector), move out of the path of the first output beam 120(1) so that it can be absorbed (e.g., by a beam dump), or change a state of the first output beam 120(1) (e.g., polarization state) such that the retroreflected beam 222 is deflected away from the first output port 108(1).

In some embodiments, the variable retroreflector 206 includes a movable mirror. Examples of the movable mirror include, but are not limited to, a mirror mounted to a galvanometer-actuated or motorized mirror mount, a mirror mounted to a motorized rotation or translation stage, and a mirror mounted to a motorized flip mount. In these examples, the movable mirror can be moved between two physical positions corresponding to the first and second operating states. In another embodiment, the variable retroreflector 206 includes a retroreflecting mirror behind an optical shutter. In this embodiment, the first output beam 120(1) retroreflects off of the retroreflecting mirror when the shutter is open, thereby seeding the mode-locked laser 100 with the retroreflected beam 222. When the shutter is closed, the first output beam 120(1) is absorbed. In another embodiment, the optical shutter has a reflective blade. When the shutter is closed, the first output beam 120(1) retroreflects off of the blade to seed the mode-locked laser 100. When the shutter is open, the first output beam 120(1) propagates past the retracted blade, where it can be absorbed, dumped, or monitored.

In other embodiments, the variable retroreflector 206 uses polarization to vary the seed power. For example, the variable retroreflector 206 may include a PBS oriented to transmit the first output beam 120(1), a polarization rotator after the PBS, and a retroreflector after the polarization rotator. In the first operating state, the polarization rotator does not alter the linear polarization of the first output beam 120(1). In this case, the retroreflecting beam is transmitted through the polarized beamsplitter to couple back into the first output port 108(1). In the second operating state, the polarization rotator rotates the linear polarization of the first output beam 120(1) by 45°. After retroreflection, the polarization rotator rotates the linear polarization by an additional 45°. In this case, the PBS deflects the retroreflected beam 222. Examples of the polarization rotator include, but are not limited to, a birefringent waveplate mounted to a rotation stage, a liquid-crystal waveplate, and an electro-optic modulator.

To use the system 200, the mode-locked laser 100 is first unidirectionally mode-locked in either the CW direction or the CCW direction. For clarity in the following discussion, it is assumed that the mode-locked laser 100 is mode-locked only in the CW direction. Accordingly, the second output beam 120(2) is a pulse train and the first output beam 120(1) is weak light that is not mode-locked (i.e., does not form a stable singe-pulse pulse train).

After the mode-locked laser 100 is unidirectionally mode-locked, the controller 208 controls the variable retroreflector 206 to transition to the first operational state (if it is not already in this state). In this state, the retroreflected beam 222 is coupled back into the laser cavity (i.e., the loop 110) via the first output port 108(1). In the laser cavity, this seed light increases competition for gain in the CCW direction. With enough power coupled back into the laser cavity, the mode-locked laser 100 transitions from unidirectional mode-locking to stable bidirectional mode-locking. At this point, the controller 208 may control the variable retroreflector 206 to transition back to the second operational state, thereby no longer retroreflecting the first output beam 120(1). The mode-locked laser 100 will remain stably single-pulse mode-locked in both CW and CCW directions, even after the system 200 has returned to the second operational state.

Figure 4:
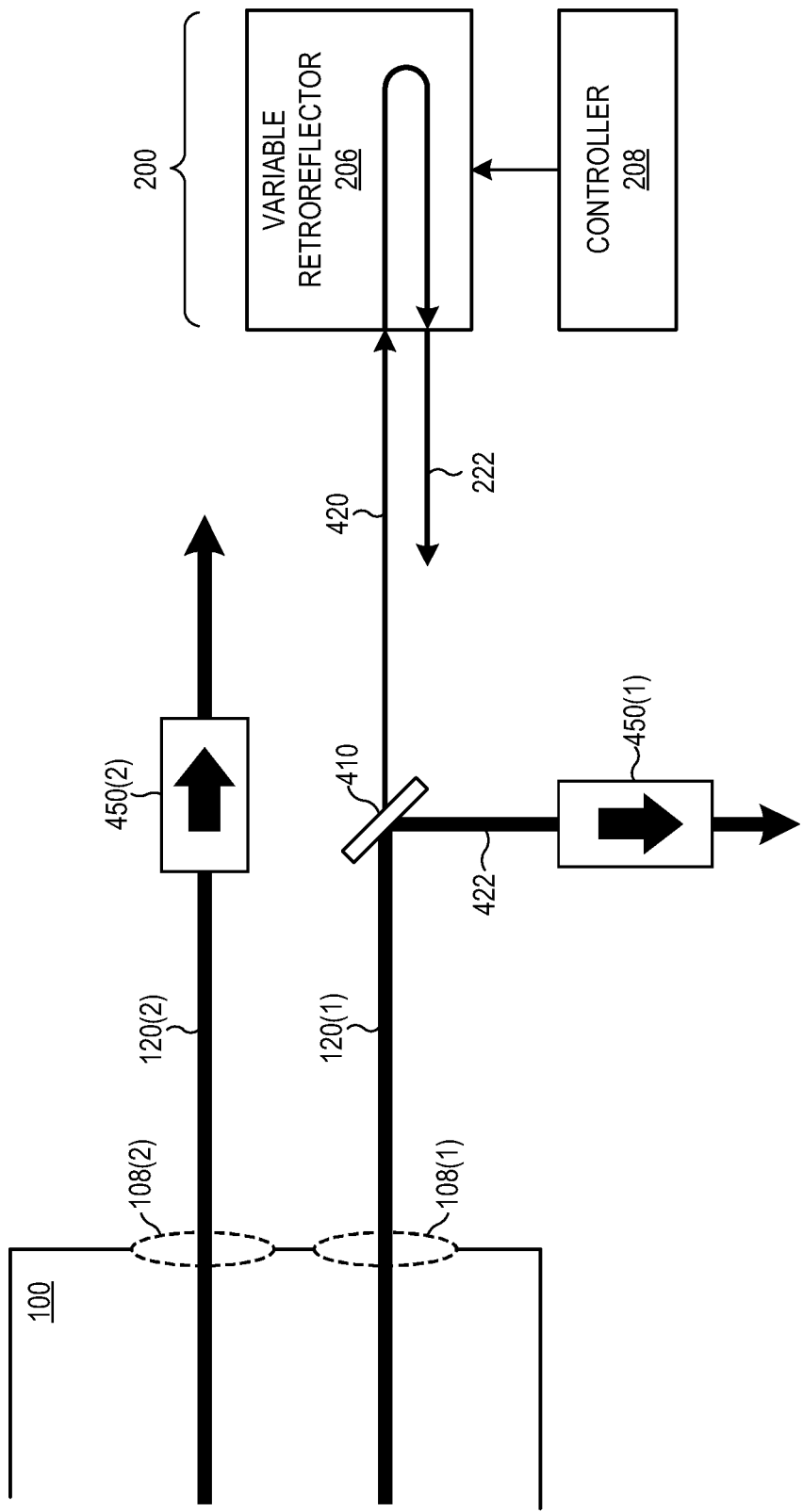
FIG. 4 shows more details about how the system of FIGS. 2 and 3 may interface with the bidirectional mode-locked fiber laser of FIG. 1, in embodiments.

FIG. 4 shows more details about how the system 200 may interface with the bidirectional mode-locked fiber laser 100 of FIG. 1. In FIG. 4, a beamsplitter 410 splits the first output beam 120(1) into a main beam 422 and an auxiliary beam 420. The main beam 422 may pass through a first optical isolator 450(1) to prevent reflections of the main beam 422 from coupling back into the laser cavity. The auxiliary beam 420 enters the variable retroreflector 206. Note that the first optical isolator 450(1) should not be located between the first output port 210(1) and the variable retroreflector 206 as it will block the retroreflected beam 222. The second output beam 120(2) passes through a second optical isolator 450(2) that prevents reflections of the second output beam 120(2) from coupling back into the laser cavity.

The retroreflected beam 222 should have enough power (i.e., seed power) to reliably seed the mode-locked laser 100 such that it can transition from unidirectional mode-locking to bidirectional mode-locking. At the same time (and as discussed below in the section titled "Experimental Demonstrations"), the seed power should not be so large that it causes the mode-locked laser 100 to lose unidirectional mode-locking. There are many ways to achieve this balance. For example, the beamsplitter 410 may be a PBS, in which case a half waveplate before the beamsplitter 410 may be rotated to change the ratio of powers of the beams 420 and 422. In another example, a fixed or variable attenuator is placed between the beamsplitter 410 and variable retroreflector 206 to reduce the seed power. In another example, the variable retroreflector 206 uses a mirror that can be finely steered to change how much is retroreflected (e.g., see the galvo-scanning mirror 634 in FIG. 6).

The variable retroreflector 206 may remain in the first operational state for a fixed duration (e.g., 1 ms or 10 ms). For example, the controller 208 may output an electrical rectangular pulse of this duration. However, the controller 208 may control the variable retroreflector 206 to transition more slowly between the operational states, thereby causing the seed power to ramp up and down (as opposed to jumping). As discussed in more detail below, slow transitions helps prevent the mode-locked laser 100 from transitioning to a Q-switch state.

There are many ways for the variable retroreflector 206 to slowly vary the seed power when transitioning between the operational states. In some embodiments, this can be achieved via the response time of the variable retroreflector 206. For example, the variable retroreflector 206 may include an optical shutter. In the first operating state, the shutter is open and the auxiliary beam 420 passes through the shutter to a retroreflecting mirror that reflects the auxiliary beam 420 into the retroreflected beam 222. In the second operating state, the shutter is closed. In this example, the blade of the optical shutter may take as long as a few milliseconds to fully traverse the auxiliary beam 420. While the blade is traversing the auxiliary beam 420, the auxiliary beam 420 is partially blocked and therefore the seed power is given by the time-varying fraction of the auxiliary beam 420 that is transmitted past the blade in both directions. Note that the relatively slow response of the optical shutter is due to its inherent response time, even when driven with a control signal having sharp rising and falling edges.

Figure 6:
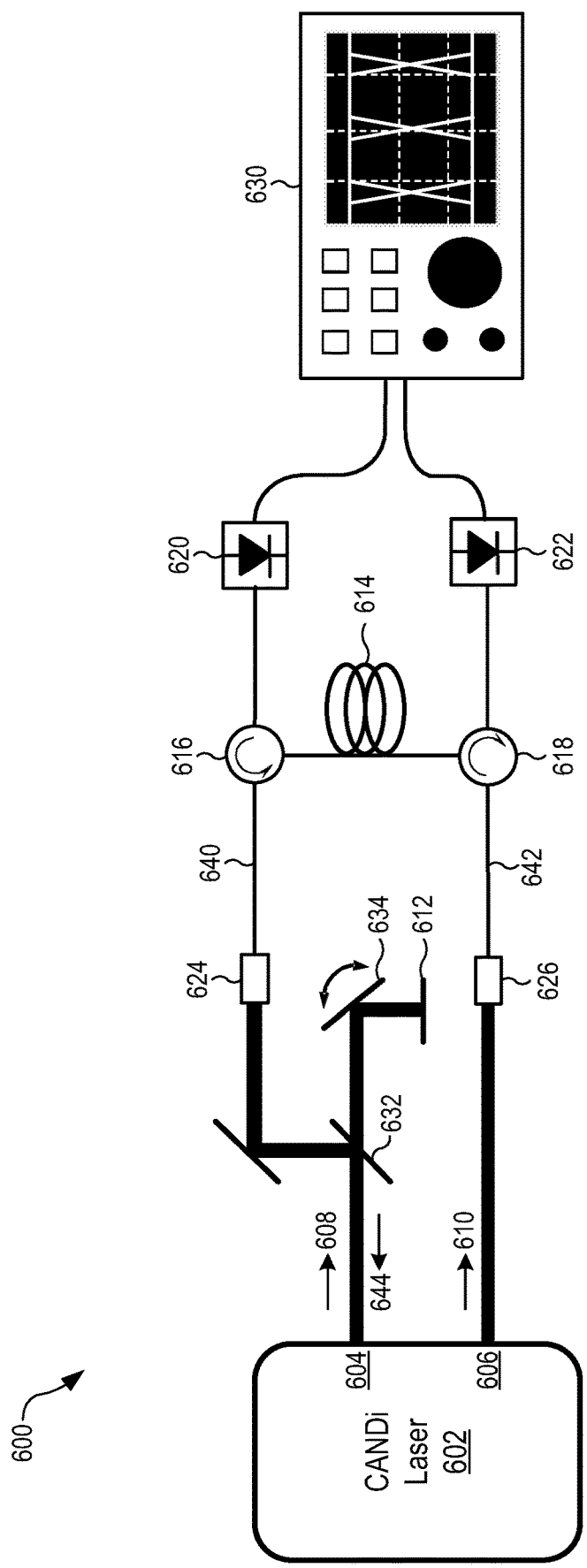
FIG. 6 is a functional diagram of an experimental set-up that was used to monitor the two outputs of a prototype counter-propagating all-normal dispersion (CANDi) laser during self-seeding, in embodiments.

In other embodiments, the variable retroreflector 206 is explicitly controlled to vary the seed power. In these embodiments, the variable retroreflector 206 has a plurality of discrete operating states, each giving rise to a different seed power. In this case, the controller 208 may control the variable retroreflector 206 to transition through a sequence of the discrete operating states, thereby changing the seed power in a discrete fashion that approximates a ramp. Alternatively, the variable retroreflector 206 may be controlled to continuously adjust the seed power (e.g., between zero and the power of the auxiliary beam 420). As described in more detail below, the galvo-scanning mirror 634 of FIG. 6 is one example of these embodiments. To control the variable retroreflector 206 in these embodiments, the controller 208 may need to output a control signal that is more complex than a rectangular pulse. For example, the controller 208 may include an arbitrary waveform generator.

Figure 5:
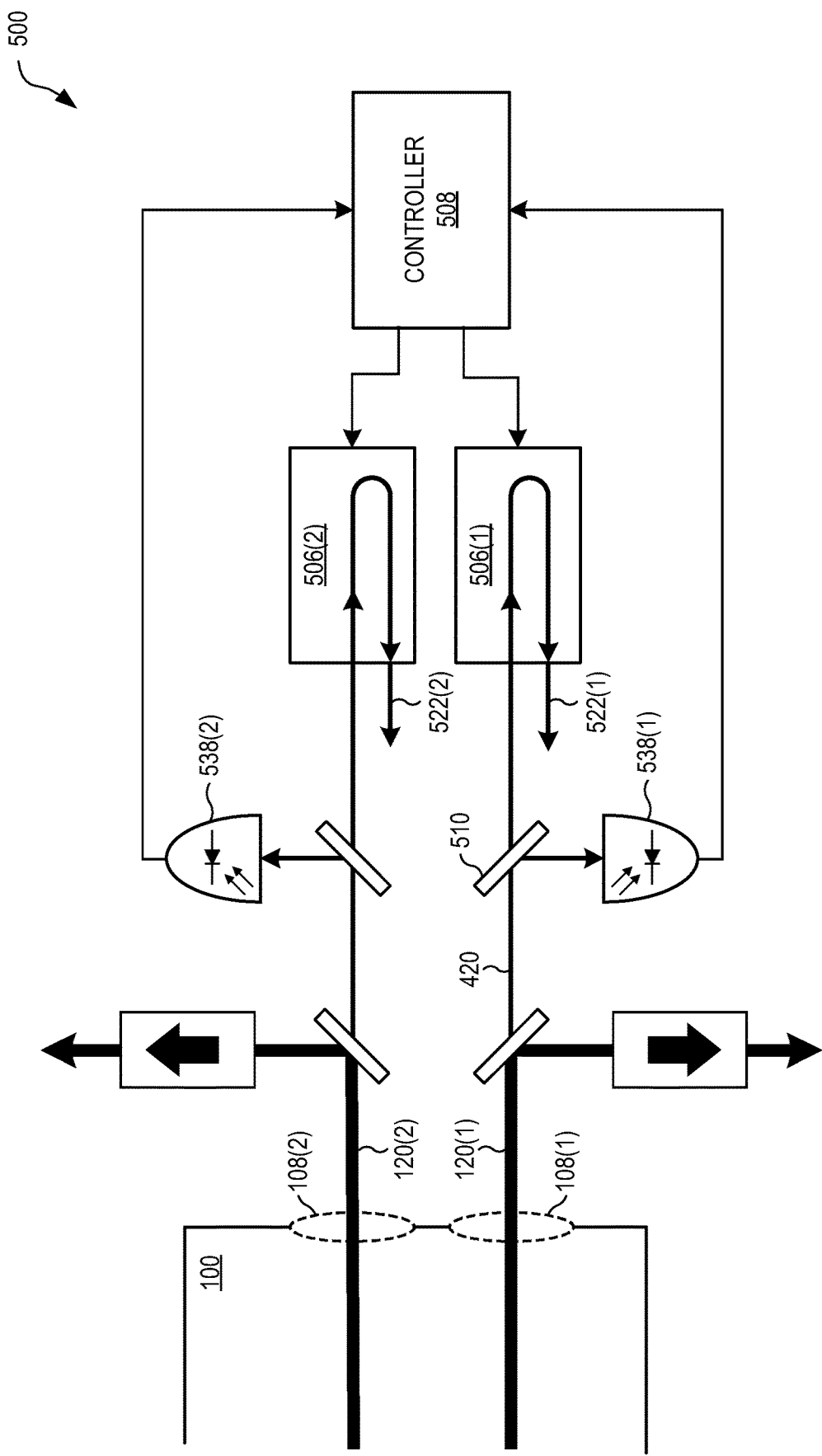
FIG. 5 is a block diagram of a system for self-seeding either of two directions of the bidirectional mode-locked fiber laser of FIG. 1, in an embodiment.

FIG. 5 is a block diagram of a system 500 for self-seeding either of two directions of the bidirectional mode-locked fiber laser 100 of FIG. 1. The system 500 includes a first variable retroreflector 506(1) and a second variable retroreflector 506(2), each of which is similar to the variable retroreflector 206 of FIG. 2. In some embodiments, the system 500 includes a controller 508 that controls the variable retroreflectors 506(1) and 506(2). In other embodiments, the controller 508 is provided by a third party. The system 500 includes a beamsplitter 510 that splits the auxiliary output beam 420 into two beams. One of these beams enters the first variable retroreflector 506(1), where it can be retroreflected into a first retroreflected beam 522(1) that couples back into the first output port 108(1). The other output of the beamsplitter 510 is detected by a first photodetector 538(1), whose output is processed by the controller 508 to determine if the first output of the laser 100 is mode-locked or not (e.g., based on the detected power). The second output beam 220(2) is detected by a second photodetector 538(2), whose output is processed by the controller 508 to determine if the second output of the laser 100 is mode-locked or not.

The system 500 accounts for the fact that unidirectional mode-locking of the mode-locked laser 100 is a random process, i.e., sometimes the laser 100 mode-locks in the CCW direction while other times it mode-locks in the CW direction. The output port 108(1) or 108(2) that is used for self-seeding depends on which output is mode-locked (i.e., only the output that is not mode-locked should be retroreflected back into its respective output port). By processing the outputs of the photodetectors 538(1) and 538(2), the controller 508 can determine which of the two outputs is mode-locked, and therefore which of the variable retroreflectors 506(1) and 506(2) to control to for self-seeding. The controller 508 can therefore properly control the variable retroreflectors 506(1) and 506(2) to induce bidirectional mode-locking regardless of which direction is initially unidirectionally mode-locked.

In another embodiment, the system 500 excludes the second variable retroreflector 506(2). In this case, the controller 508 still processes the outputs of the photodetectors 538(1) and 538(2) to determine which direction of the mode-locked laser 100 is unidirectionally mode-locked. If only the second output is mode-locked, the controller 508 may then control the first variable retroreflector 506(1) to self-seed the laser 100, thereby transitioning the laser to bidirectional mode-locking. However, if only the first output is mode-locked, then the controller 508 "resets" the laser 100. For example, the controller 508 may momentarily turn off the pump laser 128 of FIG. 1. The laser 100 is then unilaterally mode-locked again. The controller 508 repeats this process of resetting and unilaterally mode-locking the laser 100 until only the second output is mode-locked, at which point the controller 508 controls the first variable retroreflector 506(1) to self-seed the laser 100 with the first retroreflected beam 522(1).

Experimental Demonstrations

The present embodiments were experimentally demonstrated with a prototype of the bidirectional mode-locked fiber laser 100 of FIG. 1. The prototype used only normal-dispersion components. For this reason, this architecture of the prototype is referred to as a counter-propagating all-normal dispersion (CANDi) fiber laser. The prototype simultaneously achieved pulses energies of 8 nJ from both the CW and CCW directions, far exceeding the pulses energies of many other bidirectional mode-locked fiber lasers known in the art. The prototype achieved a low relative timing jitter of 34 fs (>1 kHz range), making the CANDi architecture particularly useful for nonlinear dual-comb applications like Raman spectroscopy and THz time-domain spectroscopy.

Similar with other types of bidirectional mode-locked lasers [4, 6], bidirectional mode-locking of the CANDi fiber laser is not deterministically self-starting. One reason for this is gain competition between the two directions. As reported in [16] and [17], once mode-locking is achieved in one direction, the gain is depleted and the laser will remain unidirectionally mode-locked even without an intracavity isolator. Therefore, mode-locking the CANDi fiber laser may require precise alignment of waveplates and other optical and mechanical components. Such alignment may be challenging to those without hands-on laser experience, thereby restricting the CANDi fiber laser's widespread use and adaption for applications outside of laboratory environments.

The layout of the prototype CANDi laser is shown in FIG. 1. To enhance compactness and stability, all free-space optics (e.g., the polarization controllers 148(1) and 148(2), the PBSs 112(1) and 112(2), the collimators 134(1) and 134(2), etc.) were mounted onto a five-inch breadboard (FiberBench Thorlabs). The prototype CANDi fiber laser, including a 3-W pump diode and pump driver, fit within a 10×10×3 inch$^3$ volume. All of the optical fibers (e.g., the doped fiber 126, the optical fibers 132 and 138, etc.) were temperature-controlled to improve long-term stability.

FIG. 6 is a functional diagram of an experimental set-up 600 that was used to monitor the two outputs of the prototype CANDi laser during self-seeding. The prototype CANDi laser, identified in FIG. 6 with reference number 602, has a first output 604 and a second output 606. During operation, the CANDi fiber laser 602 generated a first free-space output beam 608 that exited via the first output 604 (e.g., the first output beam 120(1) of FIG. 1) and a second free-space output beam 610 that exited via the second output 606 (e.g., the second output beam 120(2) of FIG. 1). The first output beam 608 was derived from light propagating in a first direction through the laser cavity of the CANDi fiber laser 602 (e.g., see the loop 110 in FIG. 1) while the second output beam 610 was derived from light propagating in a second direction, opposite to the first direction, through the laser cavity. The first output beam 608 was deflected by a galvo-scanning mirror 634 to a retroreflecting mirror 612. The reflection angle of the galvo-scanning mirror 634 was adjustable to control the power of seed light 644 that was coupled back into the laser cavity of the CANDi fiber laser 602. The seed light 644 is one example of the retroreflecting beam 222 shown in FIGS. 2 and 3.

To obtain an in-depth understanding of the mode-locking mechanism through real-time spectral dynamics observation, DFT was performed on the output beams 608 and 610 simultaneously. As shown in FIG. 6, a beam sampler 632 deflected a portion of the first output beam 608 toward a first collimator 624, which in turn coupled this portion into a first optical fiber 640. Similarly, a second collimator 626 coupled the second output beam 610 into a second optical fiber 642. Using optical circulators 616 and 618, light from the optical fibers 640 and 642 was coupled into opposite ends of a dispersive fiber 614 having a length of 10 km and a dispersion of 350 ps/nm. The third ports of the circulators 616 and 618 were connected to photodetectors 620 and 622, respectively, each having a bandwidth of 5 GHz. The electrical outputs of the photodetectors 620 and 622 were digitized and recorded simultaneously on two channels of a real-time oscilloscope 630 having a 3-GHz bandwidth and 5-Gs/s sampling rate. The corresponding spectral resolution was approximately 0.5 nm.

To achieve turn-key bidirectional mode-locking, the waveplates of the CANDi fiber laser 602 (e.g., the polarization controllers 148(1) and 148(2) in FIG. 1) were first tuned to positions where the CANDi fiber laser 602 achieved self-starting unidirectional mode-locking in either the first or second directions (i.e., either the CW or CCW directions). Under these conditions, due to gain competition, the CANDi fiber laser 602 randomly selected one of these two directions and mode-locked unidirectionally in this direction. The pump power was then increased to a level where double-pulse mode-locking occurred.

Figure 7A:
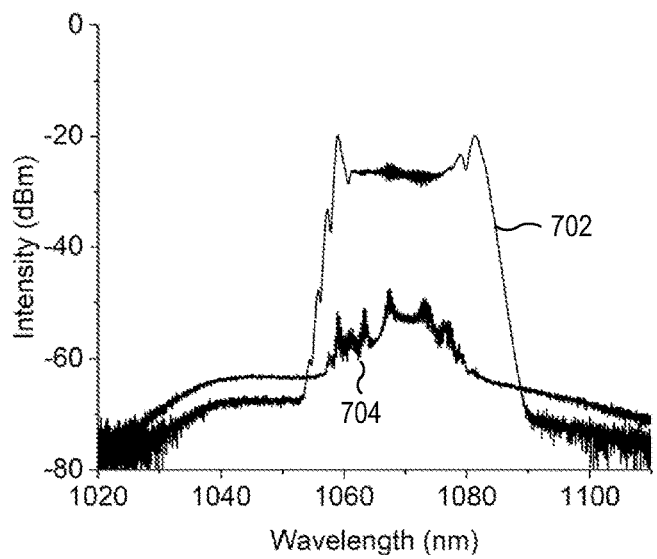
FIG. 7A is a plot showing spectra of first and second outputs of the CANDi fiber laser of FIG. 6 when the CANDi fiber laser was unidirectionally mode-locked.

FIG. 7A is a plot showing spectra of the output beams 608 and 610 when the CANDi fiber laser 602 was unidirectionally mode-locked in the first direction (i.e., the first output beam 608 was mode-locked and the second output beam 610 was not mode-locked). In FIG. 7A, the first output beam 608 had a first spectrum 702 while the second output beam 610 had a second spectrum 704. The first output beam 608 had an average power of 200 mW and was observed, using an oscilloscope, to be in a double-pulsing state with a repetition rate of approximately 34 MHz. The second spectrum 704 arose from an amplified intra-cavity reflection and had a total power of only 190 μW. This phenomenon of intracavity reflection has also been observed in other mode-locked fiber lasers without an intra-cavity isolator. By measuring the output delay between the strong and weak pulses from the first and second directions, the reflection point was been found to be the fiber facet in one of the collimators internal to the CANDi fiber laser 602 (e.g., see the collimators 134(1) and 134(2) in FIG. 1).

To enhance this seeding effect and study its influence on bidirectional mode-locking, the experimental set-up 600 of FIG. 6 was used to systematically control the power of the seed light 644. The beam sampler 632 transmitted 92% of the power of the first output beam 608. Therefore, with an estimated coupling loss of 1 dB at each fiber collimator internal to the CANDi laser 602, approximately 67% of the power of the first output beam 608 was available for use as the seed light 644.

Figure 7B:
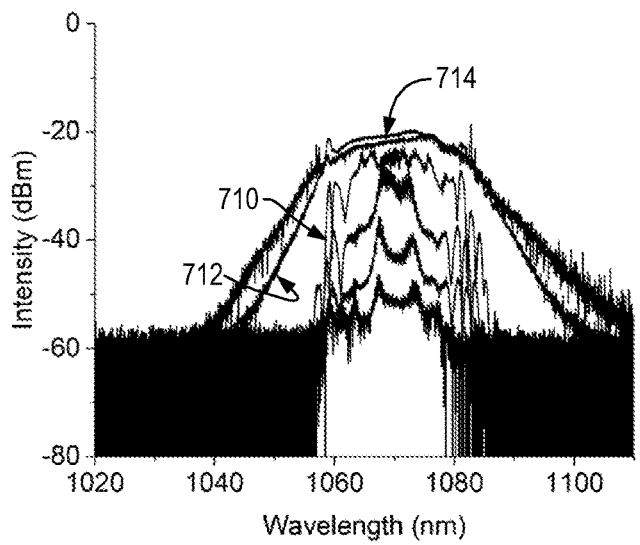
FIG. 7B is a plot showing how the spectrum of the second output of the CANDi fiber laser of FIG. 6 broadened with seed power.

FIG. 7B is a plot showing how the spectrum of the second output beam 610 broadened with seed power of the seed light 644. The seed power was controlled by adjusting the galvo-scanning mirror 634. When the seed power reached a threshold, the spectrum of the second output beam 610 jumped from the trace 710 to the trace 712; this latter trace resembles a noise-like pulse state. At the same time, the output power of the second output beam 610 jumped from 64 mW to 192 mW. By observing the waveform of the first output beam 608, we found that the double-pulse state transitioned to a single-pulse state after the jump; the power of the first output beam 608 dropped to approximately 100 mW. By further increasing the seed power, the spectrum of the second output beam 610 evolved to the trace 714, which is more stable and more closely indicates a mode-locked state. The corresponding output power of the second output beam 610 was 243 mW. Furthermore, it was found that when the spectrum of the second output beam 610 resembled the trace 712 or the trace 714, simply blocking the seed light 644 transitioned the CANDi fiber laser 602 to stable bidirectional mode-locking.

Figure 7C:
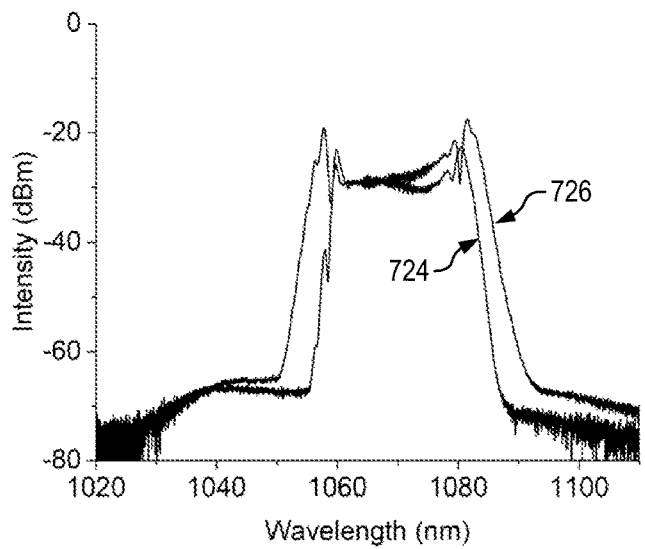
FIG. 7C is a plot showing spectra of the first and second outputs of the CANDi fiber laser of FIG. 6 when the CANDi fiber laser was bidirectionally single-pulse mode-locked.

FIG. 7C is a plot of spectra of the output beams 608 and 610 when the CANDi fiber laser 602 was bidirectionally single-pulse mode-locked. Specifically, the trace 724 is the spectrum of the first output beam 608 and the trace 726 is the spectrum of the second output beam 610.

Self-seeding bidirectional mode-locking can be understood as an enforced gain redistribution process. When the CANDi fiber laser 602 is unidirectionally mode-locked, available gain in the gain medium (e.g., the doped fiber 126 of FIG. 1) is almost depleted by the direction that mode-locks first. In this case, the weak seeding caused by the intracavity back-reflection is not strong enough to win the gain competition. Therefore, the CANDi fiber laser 602 will stably maintain unidirectional mode-locking. The external reflection can seed the gain medium from the other direction (i.e., the direction that is not mode-locked) with even higher power compared to the mode-locked direction since pulse seeding the gain medium from the second direction does not experience loss from internal components of the CANDi fiber laser (e.g., the PBSs 112(1) and 112(2) and spectral bandpass filter 156 in FIG. 1), as compared to pulse seeding from the first direction. This can also be confirmed from the higher output power from the second direction during strong seeding. Therefore, strong seeding can force the redistribution of gain such that both directions can support single-pulse mode-locking.

Figure 8B:
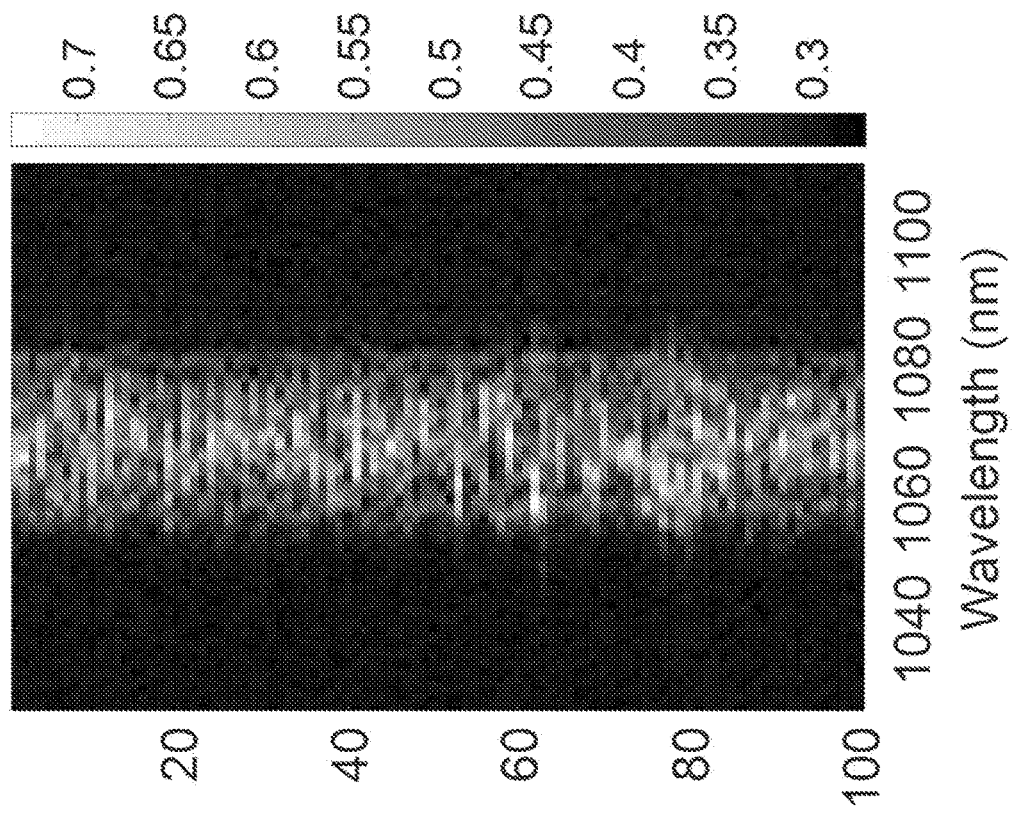
FIGS. 8A and 8B show the measured round-trip resolved spectral evolution of the first and second output beams, respectively, over 100 consecutive roundtrips.
Figure 8A:
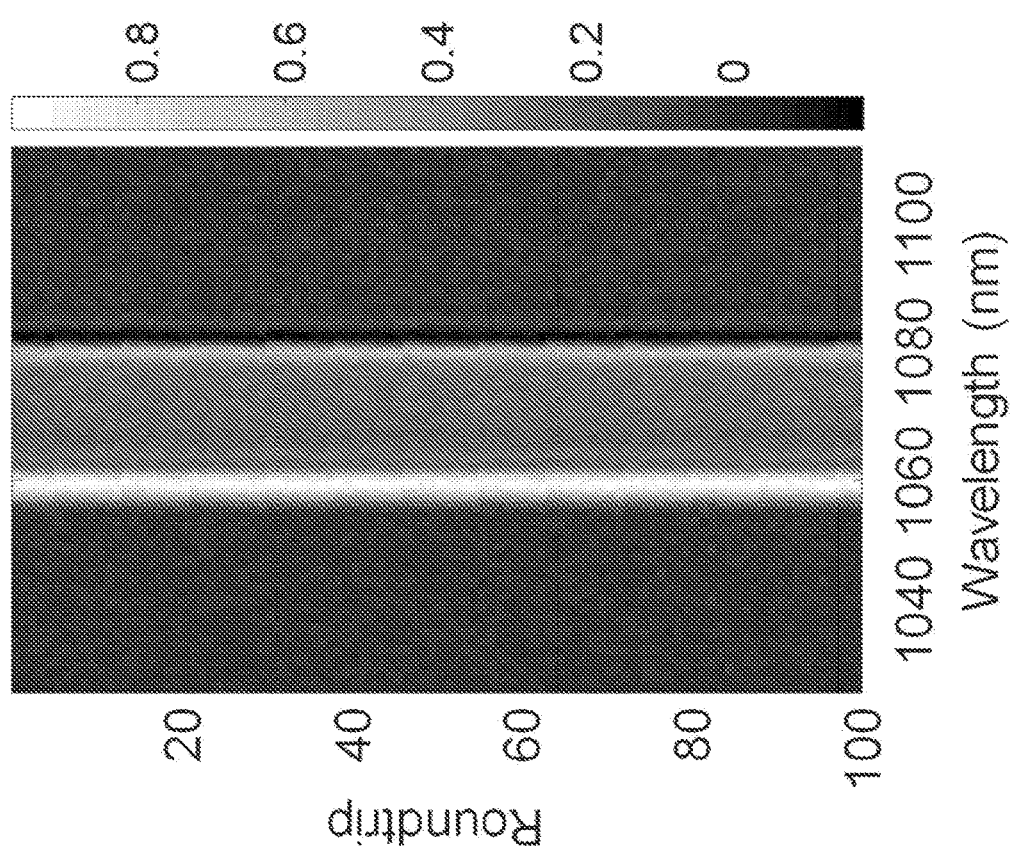

To obtain a deeper insight into the seeding dynamics, DFT was used to observe the real-time spectral evolution of both directions simultaneously during seeding. The experimental set-up 600 of FIG. 6 was used. The spectrum of the second output beam 610 was similar to the trace 714 in FIG. 7B. FIGS. 8A and 8B show the measured round-trip resolved spectral evolution of the output beams 608 and 610, respectively, over 100 consecutive roundtrips. While the first output beam 608 remained stably mode-locked, spectra of the second output beam 610 shows drastic shot-to-shot fluctuations as noise-like pulses. FIGS. 8C and 8D show the pulse energies of the output beams 608 and 610, respectively, as a function of time. The data in FIGS. 8C and 8D were obtained by integrating the measured spectral intensities of FIGS. 8A and 8B, respectively. The pulse energies of the output beams 608 and 610 have standard deviations of 1.65% (FIG. 8C) and 26.7% (FIG. 8D), respectively.

Figure 8E:
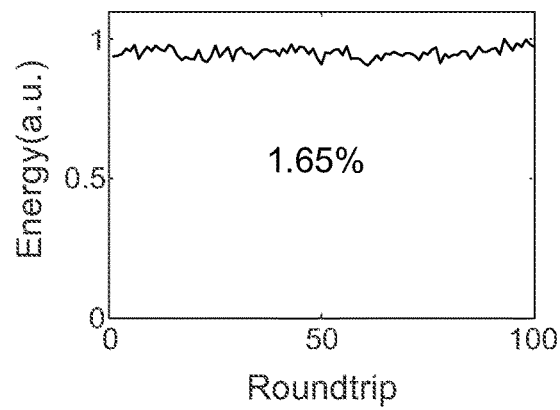
FIG. 8E is a plot of the power spectral densities of the first and second outputs of the CANDi fiber laser of FIG. 6.
Figure 8E:
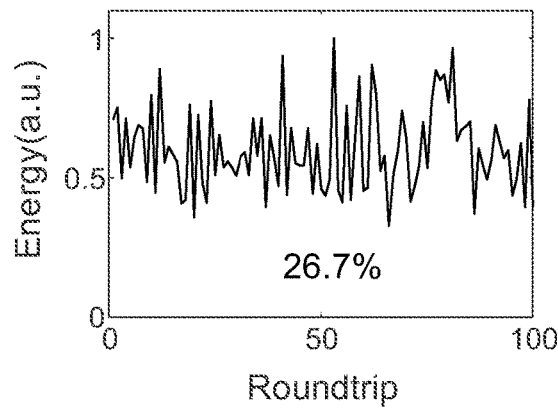
Figure 8E:
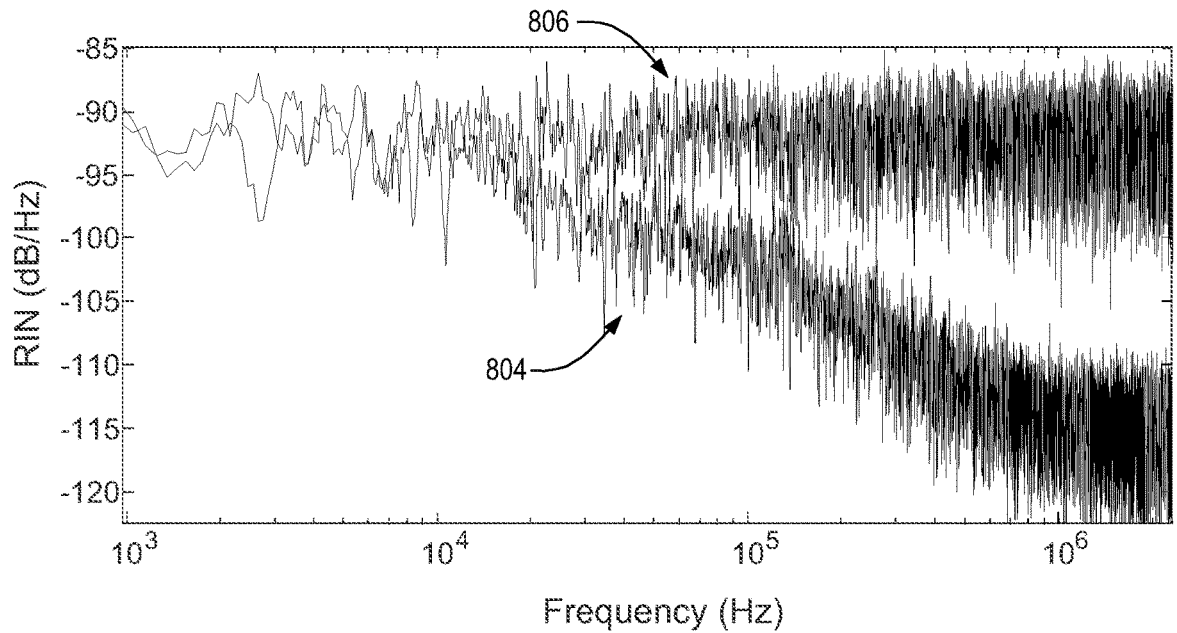

It may seem counter-intuitive that the first direction can remain stably mode-locked despite the large energy fluctuations of the second direction in the same cavity. To better understand this effect, FIG. 8E is a plot of the power spectral densities of the first output beam 608 (see the trace 804) and the second output beam (see the trace 806). The traces 804 and 806 were obtained by recording the two pulse energies for 1 ms. FIG. 8E shows that the co-existence of drastically different stability states in the same laser cavity is possible because the response time of the gain medium is relatively long. In FIG. 8E, the long-term stability (i.e., frequencies less than 20 kHz) of the two directions are almost identical. Above 20 kHz, the gain dynamics is not fast enough to respond to the fast fluctuations of the direction, and therefore the stability of mode-locking in the two directions becomes uncorrelated.

Based on the study of self-seeding dynamics, we experimentally demonstrated a turn-key bidirectional mode-locking method based on the galvo-scanning mirror 634 of FIG. 6. The position of the galvo-scanning mirror 634 was controlled by the output voltage of an arbitrary waveform generator (AWG). First, the control voltage was set to 1 V. Then, the coupling ratio (i.e., seed power) of the seed light 644 was adjusted by changing the angle of the galvo-scanning mirror 634 such that the seed light 644 was strong enough to force the mode-locking of the first direction to transition from double pulsing to single pulsing.

Figure 9A:
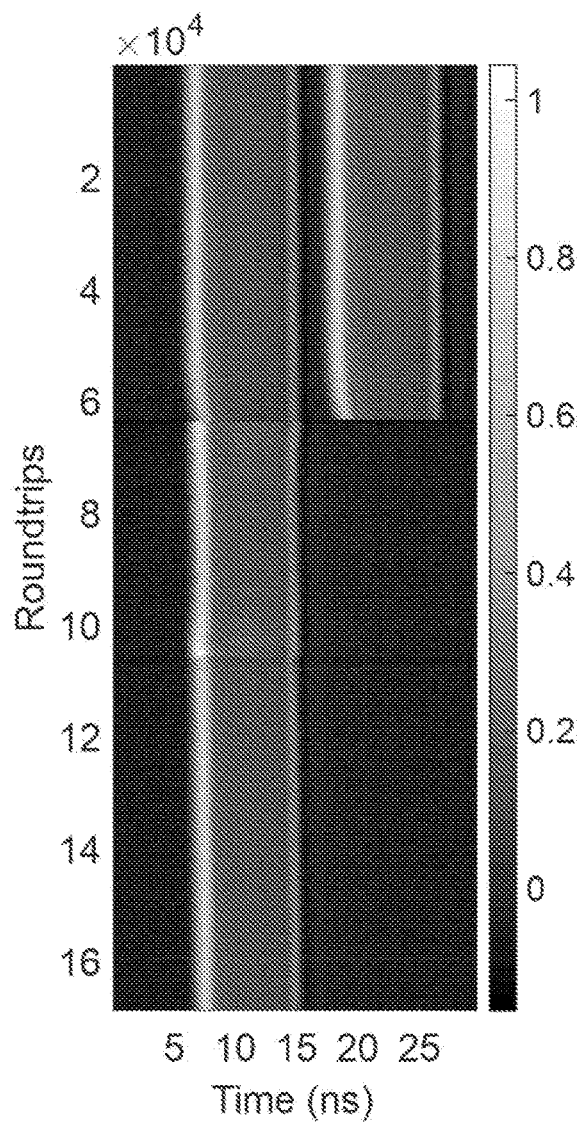
FIG. 9A is a plot of the round-trip resolved spectral evolution of the first output of the CANDi fiber laser of FIG. 6, as measured during a demonstration of self-seeded bidirectional mode-locking.
Figure 9B:
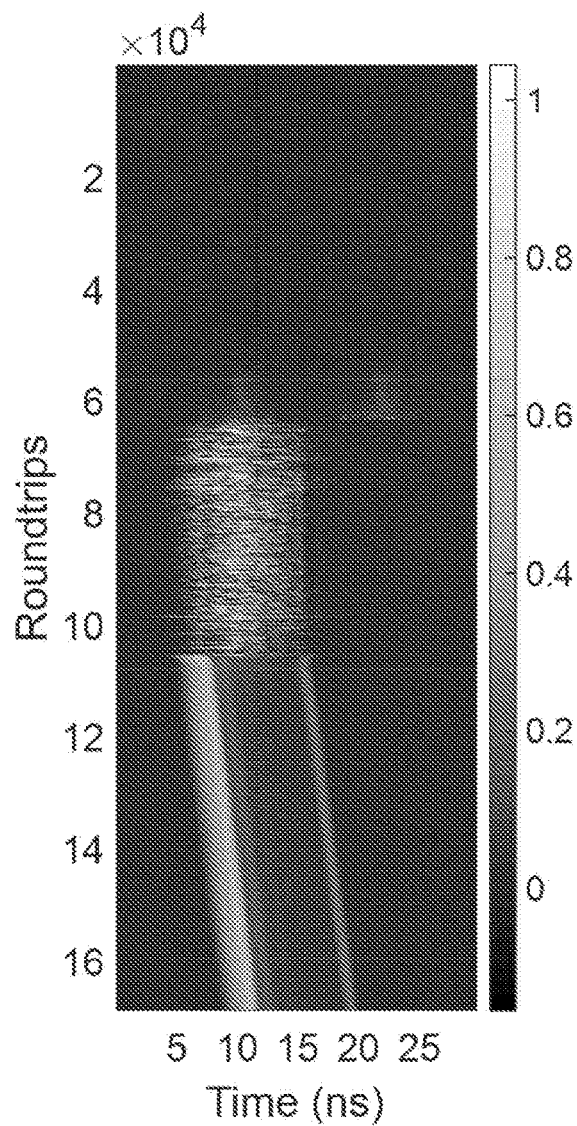
FIG. 9B is a plot of the round-trip resolved spectral evolution of the second output of the CANDi fiber laser of FIG. 6, as measured during the demonstration of self-seeded bidirectional mode-locking.
Figure 9C:
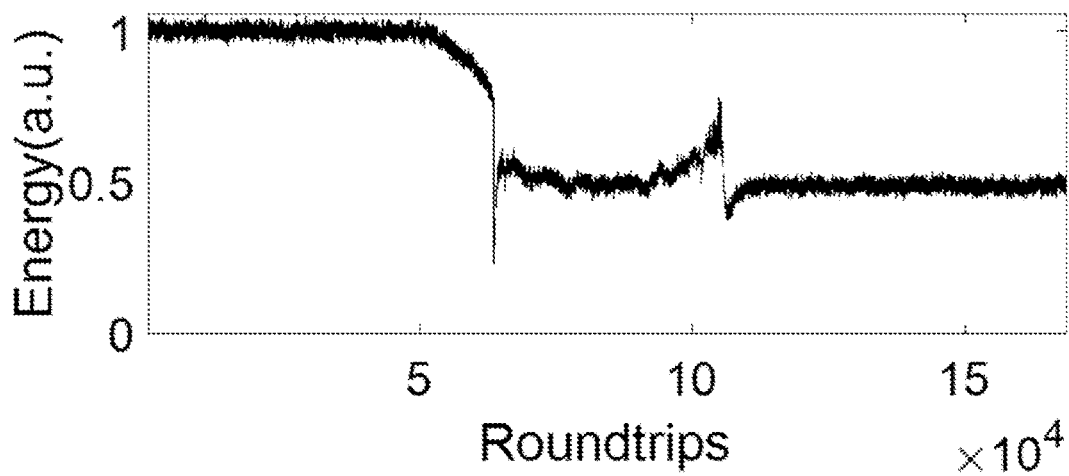
FIG. 9C is a plot of the normalized pulse energy evolution of the first output of the CANDi fiber laser of FIG. 6, as measured during the demonstration of self-seeded bidirectional mode-locking.
Figure 9D:
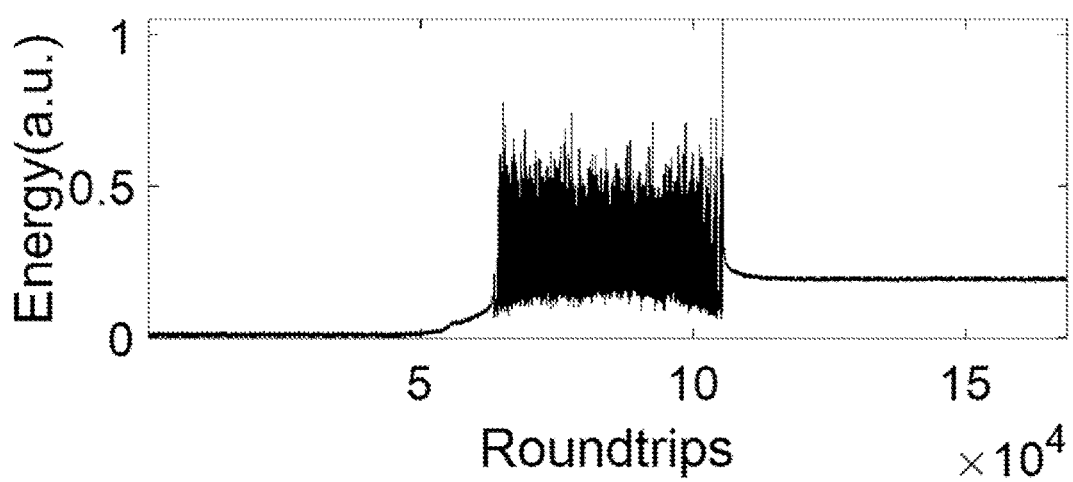
FIG. 9D is a plot of the normalized pulse energy evolution of the second output of the CANDi fiber laser of FIG. 6, as measured during the demonstration of self-seeded bidirectional mode-locking.
Figure 9E:
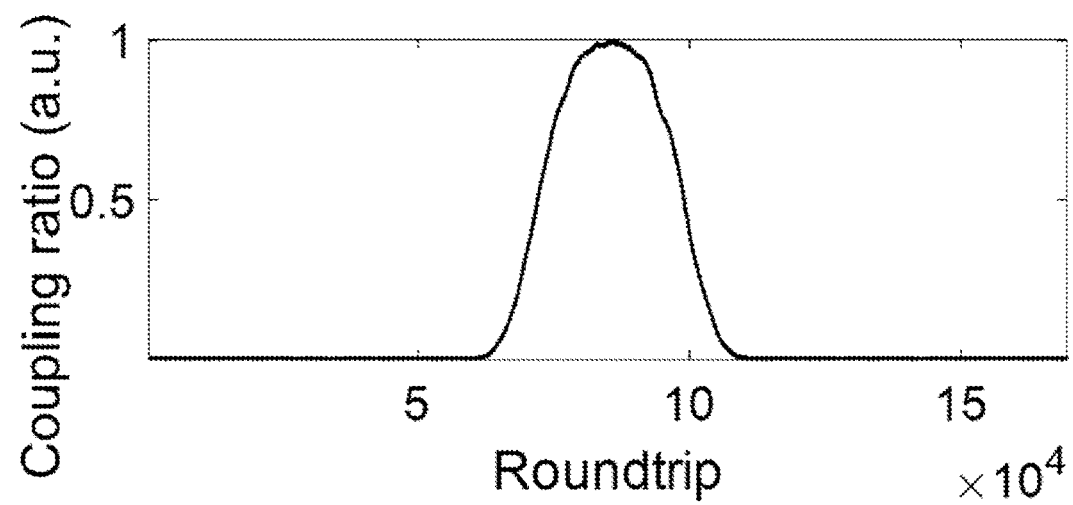
FIG. 9E is a plot showing how a galvo-scanning mirror of the experimental set-up of FIG. 6 was controlled as a function of time during the demonstration of self-seeded bidirectional mode-locking.

FIG. 9A is a plot of the round-trip resolved spectral evolution of the first output beam 608 of the CANDi fiber laser 602, as measured during the demonstration of self-seeded bidirectional mode-locking. FIG. 9B is a plot of the round-trip resolved spectral evolution of the second output beam 610 of the CANDi fiber laser 602, as measured during the demonstration of self-seeded bidirectional mode-locking. FIG. 9C is a plot of the normalized pulse energy evolution of the first output beam 608, as measured during the demonstration of self-seeded bidirectional mode-locking. FIG. 9D is a plot of the normalized pulse energy evolution of the second output beam 610, as measured during the demonstration of self-seeded bidirectional mode-locking. FIG. 9E is a plot showing how the galvo-scanning mirror 634 of FIG. 6 was controlled as a function of time during the demonstration of self-seeded bidirectional mode-locking. FIGS. 9A-9E are best viewed together with the following description.

As shown in FIG. 9E, the control signal for the galvo-scanning mirror 634 was changed to a single-pulse waveform, where the peak voltage was 1 V and the duration of the waveform was 5 ms. When idle, the AWG outputs 0 V, so the back-reflected beam is highly misaligned and no power is seeded back to the cavity. When the CANDi laser 602 was double-pulse mode-locked in the first direction, manually triggering the AWG sent a voltage pulse to the galvo-scanning mirror 634, which in turn provided the seed light 644 with a preset duration and strength. This turn-key operation was found to repeatably transition the CANDi fiber laser 602 from unidirectional double-pulse mode-locking to bidirectional single-pulse mode-locking.

Near 60,000 round trips, the seed light 644 was strong enough to influence the mode-locking state of the first direction. As shown in FIGS. 9A and 9C, the spectral bandwidth narrowed for both pulses and the pulse energy dropped as more gain was utilized by the seed light 644 in the second direction. Meanwhile, the weak seeding of the double pulse appeared in the spectrum of the second output beam 610, as shown in FIG. 9B. At 63,540 roundtrips, the energy of both pulses dropped by 30% and the spectrum of one of the pulses quickly shrank and disappeared in 10 round trips. At 63,550 round trips, the first direction was single-pulse mode-locked with a pulse energy 50% lower than at the beginning of the self-seeding. Because of the reduction of intracavity power, extra gain from the gain medium became available. In the next 1,000 round trips, the coupling ratio of the retroreflection continued to increase. During this period, the energy of the remaining pulse grew back to the original level and the second direction entered the NLP state. From 64,500 round trips to 105,500 round trips, the coupling ratio of the back reflection remained high enough that the second direction maintained the NLP state. After 105,500 round trips, the second direction smoothly transitioned from the NLP state to a stable single-pulse mode-locking state as the coupling ratio decreased.

By exploring the maximum coupling ratio and seeding duration, it was found that the aforementioned state switching process can be realized in a wide range of settings. For example, using the same waveform and maximum coupling ratio, the duration of the waveform can be changed from tens of milliseconds to as short as 1 ms to achieve the same end state. However, when the maximum coupling ratio is too high or the rising and falling edges of the coupling ratio become too steep, the CANDi fiber laser 602 may lose mode-locking and both directions will enter a Q-switch state. Unfortunately, the settings of the seeding varies among different mode-locking positions and there is not a universal setting. However, a general rule of thumb is that the seeding need to be strong enough to induce sufficient power drop in the mode-locked direction to force the mode-locking state to switch from double pulsing to single pulsing. On the other hand, the seed power should not be so great that when the other direction is noise-like pulsing, the mode-locked direction can still maintain single-pulse mode-locking. Finally, the rising and falling edges should be long enough to allow smooth transitions, which prevents the laser from entering a Q-switch state.

In addition to the experimental set-up 600, other approaches can be used to induce self-seeding. For example, a portion of the mode-locked beam can be guided to a stationary retroreflector. The beam can be unblocked and blocked (e.g., mechanically or electro-optically) to induce a similar process to that shown in FIGS. 9A to 9E. Similarly, a flip mirror can be mechanically flipped to introduce a limited duration of seeding. Since the CANDi laser 602 can stably remain in the NLP state, the lower speed of these mechanical actuators, as compared to the galvo-scanning mirror 634 is not critical as long as the maximum coupling ratio is properly chosen.

Moreover, the self-seeding systems and methods of the present embodiments can be implemented with other types of bidirectional mode-locked lasers, including bidirectional solid-state and fiber lasers. Examples of bidirectional mode-locked solid-state lasers include those whose gain medium is doped with a transition metal (e.g., Ti:Sapphire, Cr:LiSAF, etc.) or a rare-earth metal (e.g., Nd:glass, Yb:YAG, Tm:Lu$_2$O$_3$, etc.). The present embodiments can also be implemented with femtosecond-pulsed ring dye lasers and semiconductor ring lasers. The present embodiments do not require an external source of seed light, thereby enabling turn-key operation of bidirectional lasers.

Combinations of Features

Features described above as well as those claimed below may be combined in various ways without departing from the scope hereof. The following examples illustrate possible, non-limiting combinations of features and embodiments described above. It should be clear that other changes and modifications may be made to the present embodiments without departing from the spirit and scope of this invention:

(A1) A system for self-seeding a bidirectional mode-locked laser includes a variable retroreflector configured to optically couple to an output port of the bidirectional mode-locked laser. In a first operating state, the variable retroreflector retroreflects output light from the output port back into the output port. In a second operating state, the variable retroreflector does not retroreflect the output light back into the output port.

(A2) In the system denoted (A1), the system further includes a controller configured to transition the variable retroreflector between the first and second operating states.

(A3) In either of the systems denoted (A1) and (A2), the system further includes beam dump. The variable retroreflector, in the second operating state, reflects the output light into the beam dump.

(A4) In any of the systems denoted (A1) to (A3), the variable retroreflector includes a galvanometer-actuated mirror. In the first operating state, the galvanometer-actuated mirror retroreflects the output light back into the output port. In the second operating state, the galvanometer-actuated mirror reflects the output light away from the output port.

(A5) In any of the systems denoted (A1) to (A3), the variable retroreflector includes a mirror mounted to a rotation stage. In the first operating state, the rotation stage orients the mirror to retroreflect the output light back into the output port. In the second operating state, the rotation stage orients the mirror to reflect the output light back away from the output port.

(A6) In any of the systems denoted (A1) to (A3), the variable retroreflector includes a mirror mounted to a flip mount. In the first operating state, the flip mount positions the mirror in a path of the output light to retroreflect the output light back into the output port. In the second operating state, the flip mount positions the mirror out of the path of the output light such that the output light misses the mirror.

(A7) In any of the systems denoted (A1) to (A3), the variable retroreflector includes a mirror mounted to a translation stage. In the first operating state, the translation stage positions the mirror in a path of the output light to retroreflect the output light back into the output port. In the second operating state, the translation stage positions the mirror out of the path of the output light such that the output light misses the mirror.

(A8) In any of the systems denoted (A1) to (A3), the variable retroreflector includes a retroreflecting mirror and a shutter. In the first operating state, the shutter is open such that the output light is transmitted through the shutter to retroreflect off the retroreflecting mirror. In the second operating state, the shutter is closed such that the output light is blocked from the retroreflecting mirror.

(A9) In any of the systems denoted (A1) to (A3), the variable retroreflector includes a retroreflecting shutter. In the first operating state, the retroreflecting shutter is closed such that the output light retroreflects off a blade of the retroreflecting shutter. In the second operating state, the retroreflecting shutter is open such that the output light is transmitted through the retroreflecting shutter.

(A10) In any of the systems denoted (A1) to (A3), the output light has a linear polarization. The variable retroreflector includes a polarized beamsplitter oriented to transmit the output light, a polarization rotator located after the polarized beamsplitter, and a retroreflecting mirror located after the polarization rotator. In the first operating state, the polarization rotator does not alter the linear polarization such that the output light, after retroreflecting off of the retroreflecting mirror, is transmitted through the polarized beamsplitter to couple back into the output port. In the second operating state, the polarization rotator rotates the linear polarization such that the output light, after retroreflecting off of the retroreflecting mirror, is deflected by the polarized beamsplitter.

(A11) In the system denoted (A10), the polarization rotator includes a birefringent waveplate mounted to a rotation stage, a half-wave liquid-crystal waveplate, or an electro-optic modulator.

(A12) In any of the systems denoted (A1) to (A11), the system includes a beamsplitter located between the variable retroreflector and the output port.

(A13) In any of the systems denoted (A1) to (A12), the system further includes the bidirectional mode-locked laser.

(A14) In the system denoted (A13), the bidirectional mode-locked laser includes a solid-state laser or a fiber laser.

(B1) A method for self-seeding a bidirectional mode-locked laser includes unidirectionally mode-locking the bidirectional mode-locked laser to generate a first pulse train that exits the bidirectional mode-locked laser via a first output port; retroreflecting, when the bidirectional mode-locked laser is unidirectionally mode-locked, output light exiting the bidirectional mode-locked laser via a second output port back into the second output port; and stopping said retroreflecting after the bidirectional mode-locked laser has transitioned from unidirectional mode-locking to bidirectional mode-locking.

(B2) In the method denoted (B1), the method further includes determining that the bidirectional mode-locked laser has transitioned from unidirectional mode-locking to bidirectional mode-locking.

(B3) In the method denoted (B2), the method further includes detecting the output light with a photodetector. Said determining is based on an output of the photodetector.

(B4) In any of the methods denoted (B1) to (B3), said retroreflecting is performed by a variable retroreflector operating in a first operating state. Said stopping includes controlling the variable retroreflector to transition from the first operating state to a second operating state.

(B5) In the method denoted (B4), said stopping includes driving a flip mount, a rotation stage, a linear translation stage, a galvanometer-actuated mirror, an electro-optic modulator, and a half-wave liquid-crystal waveplate.

(B6) In any of the methods denoted (B1) to (B5), the method further includes splitting the output light into first and second beams. Said retroreflecting includes retroreflecting the first beam back into the second output port. The second beam includes a second pulse train when the bidirectional mode-locked laser is bidirectionally mode-locked Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween

REFERENCES

1. K. Kieu and M. Mansuripur, Opt. Lett. 33, 64-66 (2008).
2. X. Yao, Appl. Opt. 53, 27-31 (2014).
3. C. Zeng, X. Liu, and L. Yun, Opt. Express 21, 18937-18942 (2013).
4. A. A. Krylov, D. S. Chernykh, N. R. Arutyunyan, V. V. Grebenyukov, A. S. Pozharov, and E. D. Obraztsova, Appl. Opt. 55, 4201-4209 (2016).
5. M. Chernysheva, M. Al Araimi, H. Kbashi, R. Arif, S. V. Sergeyev, and A. Rozhin, Opt. Express 24, 15721-15729 (2016).
6. Y. Nakajima, Y. Hata, and K. Minoshima, Opt. Express 27, 5931-5944 (2019)
7. T. Ideguchi, T. Nakamura, Y. Kobayashi, and K. Goda, Optica 3, 748-753 (2016).
8. Q. F. Yang, X. Yi, K. Y. Yang, and K. J. Vahala, Nat. Photon. 11, 560-564 (2017).
9. K. C. Cossel et al., Optica 4, 724-728 (2017).
10. I. Coddington, N. Newbury, and W. Swann, Optica 3, 414-426 (2016).
11. C. Bao, M. G. Suh, and K Vahala, Optica 6, 1110-1116 (2019).
12. K. Shibuya, T. Minamikawa, Y. Mizutani, H. Yamamoto, K. Minoshima, T. Yasui, and T. Iwata, Opt. Express 25, 21947-21957 (2017).
13. J. Kang, P. Feng, B. Li, and K. K. Y. Wong, in Advanced Photonics 2018 (BGPP, IPR, NP, NOMA, Sensors, Networks, SPPCom, SOF), OSA Technical Digest (online) (Optica Publishing Group, 2018), paper SeTu3H.2.
14. J. Nürnberg, B. Willenberg, C. R. Phillips, and U. Keller, Opt. Express 29, 24910-24918 (2021).
15. I. Coddington, W. C. Swann, L. Nenadovic, and N. R. Newbury, Nature Photon. 3, 351-356 (2009).
16. L. M. Zhao, D. Y. Tang, T. H. Cheng, and C. Lu, J. Opt. A: Pure Appl. Opt. 9 477 (2007).
17. D. Li, D. Shen, L. Li, H. Chen, D. Tang, and L. Zhao, Appl. Opt. 54, 7912-7916 (2015).

What is claimed is:

1. A system for self-seeding a bidirectional mode-locked laser, comprising:
    a variable retroreflector configured to optically couple to an output port of the bidirectional mode-locked laser;
    wherein:
        the variable retroreflector, in a first operating state, retroreflects output light from the output port back into the output port; and
        the variable retroreflector, in a second operating state, does not retroreflect the output light back into the output port.

2. The system of claim 1, further comprising a controller configured to transition the variable retroreflector between the first and second operating states.

3. The system of claim 1, further comprising a beam dump, wherein the variable retroreflector, in the second operating state, reflects the output light into the beam dump.

4. The system of claim 1, wherein:
the variable retroreflector comprises a galvanometer-actuated mirror;
the galvanometer-actuated mirror, in the first operating state, retroreflects the output light back into the output port; and
the galvanometer-actuated mirror, in the second operating state, reflects the output light away from the output port.

5. The system of claim 1, wherein:
the variable retroreflector comprises a mirror mounted to a rotation stage;
the rotation stage, in the first operating state, orients the mirror to retroreflect the output light back into the output port; and
the rotation stage, in the second operating state, orients the mirror to reflect the output light back away from the output port.

6. The system of claim 1, wherein:
the variable retroreflector comprises a mirror mounted to a flip mount;
the flip mount, in the first operating state, positions the mirror in a path of the output light to retroreflect the output light back into the output port; and
the flip mount, in the second operating state, positions the mirror out of the path of the output light such that the output light misses the mirror.

7. The system of claim 1, wherein:
the variable retroreflector comprises a mirror mounted to a translation stage;
the translation stage, in the first operating state, positions the mirror in a path of the output light to retroreflect the output light back into the output port; and
the translation stage, in the second operating state, positions the mirror out of the path of the output light such that the output light misses the mirror.

8. The system of claim 1, wherein:
the variable retroreflector comprises a retroreflecting mirror and a shutter;
the shutter, in the first operating state, is open such that the output light is transmitted through the shutter to retroreflect off the retroreflecting mirror; and
the shutter, in the second operating state, is closed such that the output light is blocked from the retroreflecting mirror.

9. The system of claim 1, wherein:
the variable retroreflector comprises a retroreflecting shutter;
the retroreflecting shutter, in the first operating state, is closed such that the output light retroreflects off a blade of the retroreflecting shutter; and
the retroreflecting shutter, in the second operating state, is open such that the output light is transmitted through the retroreflecting shutter.

10. The system of claim 1, wherein:
the output light has a linear polarization;
the variable retroreflector comprises:
a polarized beamsplitter oriented to transmit the output light;
a polarization rotator located after the polarized beamsplitter; and
a retroreflecting mirror located after the polarization rotator;
the polarization rotator, in the first operating state, does not alter the linear polarization such that the output light, after retroreflecting off of the retroreflecting mirror, is transmitted through the polarized beamsplitter to couple back into the output port; and
the polarization rotator, in the second operating state, rotates the linear polarization such that the output light, after retroreflecting off of the retroreflecting mirror, is deflected by the polarized beamsplitter.

11. The system of claim 10, the polarization rotator comprising a birefringent waveplate mounted to a rotation stage, a half-wave liquid-crystal waveplate, or an electro-optic modulator.

12. The system of claim 1, further comprising a beamsplitter located between the variable retroreflector and the output port.

13. The system of claim 1, further comprising the bidirectional mode-locked laser.

14. The system of claim 1, the bidirectional mode-locked laser comprising a solid-state laser or a fiber laser.

15. A method for self-seeding a bidirectional mode-locked laser, comprising:
unidirectionally mode-locking the bidirectional mode-locked laser to generate a first pulse train that exits the bidirectional mode-locked laser via a first output port;
retroreflecting, when the bidirectional mode-locked laser is unidirectionally mode-locked, output light exiting the bidirectional mode-locked laser via a second output port back into the second output port; and
stopping said retroreflecting after the bidirectional mode-locked laser has transitioned from unidirectional mode-locking to bidirectional mode-locking.

16. The method of claim 15, further comprising determining that the bidirectional mode-locked laser has transitioned from unidirectional mode-locking to bidirectional mode-locking.

17. The method of claim 16,
further comprising detecting the output light with a photodetector;
wherein said determining is based on an output of the photodetector.

18. The method of claim 15, wherein:
said retroreflecting is performed by a variable retroreflector operating in a first operating state; and
said stopping comprises controlling the variable retroreflector to transition from the first operating state to a second operating state.

19. The method of claim 18, wherein said stopping comprises driving a flip mount, a rotation stage, a linear translation stage, a galvanometer-actuated mirror, an electro-optic modulator, and a half-wave liquid-crystal waveplate.

20. The method of claim 15, wherein:
the method further comprises splitting the output light into first and second beams;
said retroreflecting includes retroreflecting the first beam back into the second output port; and
the second beam comprises a second pulse train when the bidirectional mode-locked laser is bidirectionally mode-locked.

* * * * *